(12) United States Patent
Lamparter

(10) Patent No.: US 7,445,188 B2
(45) Date of Patent: Nov. 4, 2008

(54) MODULAR SYSTEM

(75) Inventor: Ronald C. Lamparter, Grosse Pointe Shores, MI (US)

(73) Assignee: Specialty Manufacturing, Inc., Pineville, NC (US)

( * ) Notice: Subject to any disclaimer, the term of this patent is extended or adjusted under 35 U.S.C. 154(b) by 0 days.

(21) Appl. No.: 10/389,193

(22) Filed: Mar. 14, 2003

(65) Prior Publication Data
US 2003/0178543 A1 Sep. 25, 2003

Related U.S. Application Data

(60) Provisional application No. 60/364,913, filed on Mar. 15, 2002.

(51) Int. Cl.
*A47H 1/10* (2006.01)
(52) U.S. Cl. .............. 248/326; 108/149; 362/479; 312/246; 211/113; 182/150
(58) Field of Classification Search ............ 108/149, 108/137, 90, 69, 44; 248/326, 125.8, 163.2, 248/317, 320; 105/334, 335, 332; 224/29.5; 312/246, 248; 244/118.5; 296/178, 208, 296/37.7; 362/479, 488, 490, 480; 182/127, 182/150; 211/113, 118, 86.01, 87.01, 117
See application file for complete search history.

(56) References Cited

U.S. PATENT DOCUMENTS

| | | | | |
|---|---|---|---|---|
| 1,376,924 A | * | 5/1921 | Dixson | 182/119 |
| 1,969,547 A | * | 8/1934 | Corsgren | 108/4 |
| 2,251,050 A | | 7/1941 | Hagerty et al. | |
| 2,609,072 A | * | 9/1952 | Levinson | 190/11 |
| 2,768,043 A | * | 10/1956 | Kristoff et al. | 108/46 |
| 2,779,864 A | * | 1/1957 | Eichner | 362/484 |
| 2,818,317 A | * | 12/1957 | Little, Jr. | 108/44 |
| 2,947,585 A | * | 8/1960 | Fazio | 108/44 |
| 3,355,210 A | | 11/1967 | Cripe | |
| 3,577,903 A | | 5/1971 | Eggert, Jr. | |
| 3,799,071 A | * | 3/1974 | Gerlach | 108/46 |
| 4,387,415 A | | 6/1983 | Domas | |
| 4,574,336 A | | 3/1986 | Mikalonis | |
| 4,583,777 A | | 4/1986 | Myburgh | |
| 4,625,267 A | | 11/1986 | Mikalonis | |
| 4,713,949 A | * | 12/1987 | Wilcox | 68/235 R |
| 4,789,196 A | | 12/1988 | Fields | |
| 4,799,631 A | | 1/1989 | Humphries et al. | |
| 5,006,966 A | | 4/1991 | Mikalonis | |
| 5,108,048 A | | 4/1992 | Chang | |
| 5,113,322 A | | 5/1992 | Mikalonis | |

(Continued)

*Primary Examiner*—Kimberly T. Wood
(74) *Attorney, Agent, or Firm*—Reising Ethington Barnes Kisselle, PC

(57) ABSTRACT

A modular system for use in a vehicle comprising a hanger bracket adapted to be secured to the vehicle. A second hanger bracket member is slidably connected with a first hanger bracket. A platform member extends transverse to the second hanger bracket member. An extension is slidably disposed on the platform. The extension defines a first groove thereon. The extension defines a second groove thereon. A top deck panel is disposed adjacent the first platform extension section and is disposed in the first groove. A bottom deck panel is disposed adjacent the second platform extension section and is disposed in the second groove. The modular system can provide many functions in the vehicle such as, luggage racks, HVAC ducting, wiring raceways, lighting, advertising panels, and window blinds.

51 Claims, 10 Drawing Sheets

U.S. PATENT DOCUMENTS

| | | | |
|---|---|---|---|
| 5,207,162 A * | 5/1993 | Mismas | 108/65 |
| D342,707 S | 12/1993 | Fields | |
| 5,370,060 A * | 12/1994 | Wang | 108/44 |
| 5,395,074 A | 3/1995 | Hart et al. | |
| 5,400,993 A | 3/1995 | Hamilton | |
| 5,421,646 A * | 6/1995 | McNamara et al. | 312/205 |
| 5,422,794 A | 6/1995 | Drake | |
| 5,441,326 A | 8/1995 | Mikalonis | |
| 5,443,018 A * | 8/1995 | Cromwell | 108/44 |
| 5,549,258 A | 8/1996 | Hart et al. | |
| 5,678,914 A | 10/1997 | Dealey et al. | |
| 5,687,929 A | 11/1997 | Hart et al. | |
| 5,716,027 A | 2/1998 | Hart et al. | |
| 5,746,139 A * | 5/1998 | Villanueva | 108/92 |
| 5,752,760 A | 5/1998 | Dealey, Jr. et al. | |
| 5,842,668 A * | 12/1998 | Spencer | 244/118.1 |
| 5,857,758 A | 1/1999 | Dealey, Jr. et al. | |
| 5,860,723 A | 1/1999 | Domas et al. | |
| 5,934,615 A * | 8/1999 | Treichler et al. | 244/118.5 |
| 5,950,816 A * | 9/1999 | Reid | 206/38.1 |
| 6,012,257 A | 1/2000 | Caplette | |
| 6,047,500 A | 4/2000 | Caplette | |
| 6,073,892 A | 6/2000 | Dittmer | |
| 6,082,879 A | 7/2000 | Myburgh | |
| 6,101,771 A | 8/2000 | Aikens | |
| 6,152,586 A | 11/2000 | Dealey, Jr. et al. | |
| 6,238,075 B1 | 5/2001 | Dealey, Jr. et al. | |
| 6,241,186 B1 | 6/2001 | Calnon | |
| 6,244,715 B1 | 6/2001 | McCauley et al. | |
| 6,250,028 B1 | 6/2001 | Caplette | |
| 6,275,644 B1 | 8/2001 | Domas et al. | |
| 6,318,671 B1 | 11/2001 | Schumacher et al. | |
| 6,350,048 B1 | 2/2002 | Stanton et al. | |
| 6,485,078 B1 * | 11/2002 | Lim | 296/37.7 |
| 7,077,373 B1 * | 7/2006 | Hoebener et al. | 248/278.1 |

* cited by examiner

MODULAR SYSTEM

This application is based on and claims priority in U.S. Provisional Patent Application Ser. No. 60/364,913 filed Mar. 15, 2002.

FIELD OF THE INVENTION

The present invention relates to a modular system and, in particular, a modular system suitable for use on public transit vehicles such as buses, coaches, trains, subways, airplanes, or other transit type vehicles.

BACKGROUND

Virtually all transit vehicles require some type of ducting that runs throughout the complete length of the passenger compartment for the purpose of distributing air from a heater, ventilator, or air conditioning unit which is normally mounted either on the roof top of the vehicle or in the front or rear of the vehicle.

Additionally, most public transit vehicles require some form of lighting that runs throughout the full length of the passenger compartment to provide interior illumination for the passengers.

Additionally, some public transit vehicles include luggage or parcel racks where passengers can stow items such as brief cases, luggage or other types of packages. In certain city public transit vehicles, the luggage rack is eliminated in favor of an illuminated panel that can support printed placards containing informational displays.

The prior art addresses each of these configurations by providing a system of various components. Each of these systems requires custom fabrication of the components to be adaptable to fit within a wide variety of public transit vehicle models. This is because public transit vehicles are not of standard width, height, interior design of windows, and roof configuration, for example.

The result is that each of the presently known systems requires many different components which require a considerable amount of custom design and special fabrication so as to fit each of the different public transit vehicles.

SUMMARY

According to one embodiment of the present invention, there is provided a modular system for use in a vehicle. The modular system comprises a hanger bracket adapted to be secured to the vehicle comprising a hanger bracket member and a platform member. The modular system further includes an extension slidably disposed on the platform member.

According to another embodiment of the present invention, there is provided a hanger bracket for use in a vehicle of the type including a roof. The hanger bracket comprises a mounting member adapted for connection with the vehicle. The hanger bracket further comprises a first hanger bracket member connected to the mounting member and a second hanger bracket member slidably connected with the first hanger bracket member. The second hanger bracket member includes a platform member that extends transverse to the first hangar bracket member.

According to another embodiment of the invention, there is provided a modular system for use in a vehicle comprising a hanger bracket adapted to be secured to the vehicle. The hanger bracket includes a mounting member. A first hanger bracket is pivotally secured to the mounting member. A second hanger bracket member is slidably connected with the first hangar bracket. A platform member extends transverse to the second hanger bracket member. An extension is slidably disposed on the platform. The extension comprises a first platform extension section, a second platform extension section and an end wall. The end wall is connected to at least one of the first and the second platform extension sections. The first and the second platform extension sections are disposed adjacent the platform member and are slideable with respect thereto. The first platform extension section defines a first groove thereon adjacent the first platform extension section. The extension defines a second groove adjacent the second platform extension section. A top deck panel is disposed adjacent the first platform extension section and is disposed in the first groove. A bottom deck panel is disposed adjacent the second platform extension section and is disposed in the second groove.

According to another embodiment of the invention, there is provided a method of securing a modular system to a vehicle comprising securing a mounting member of a hanger bracket including a first hanger bracket member and a second hanger bracket member having a platform member to a vehicle. The first hanger bracket member is pivoted relative to the mounting member to a desired position. The first hanger bracket is secured to the mounting member to limit further pivoting movement. The second hanger bracket member is adjusted with respect to the first hanger bracket member to a desired position. The second hanger bracket is then secured to the first hanger bracket to limit further movement between the second hanger bracket and the first hanger bracket. An extension is placed on the platform member. The extension is positioned with respect to the platform member to a desired position. The extension is secured to limit further movement between the extension and the platform member.

BRIEF DESCRIPTION OF THE DRAWINGS

FIG. 8*a* is a side elevational view, partially in cross section, of a luggage retainer in accordance with one embodiment of the present invention;

DETAILED DESCRIPTION OF THE DRAWINGS

The following description of the preferred embodiment(s) is merely exemplary in nature and is in no way intended to limit the invention, its application, or uses.

Figure 1:
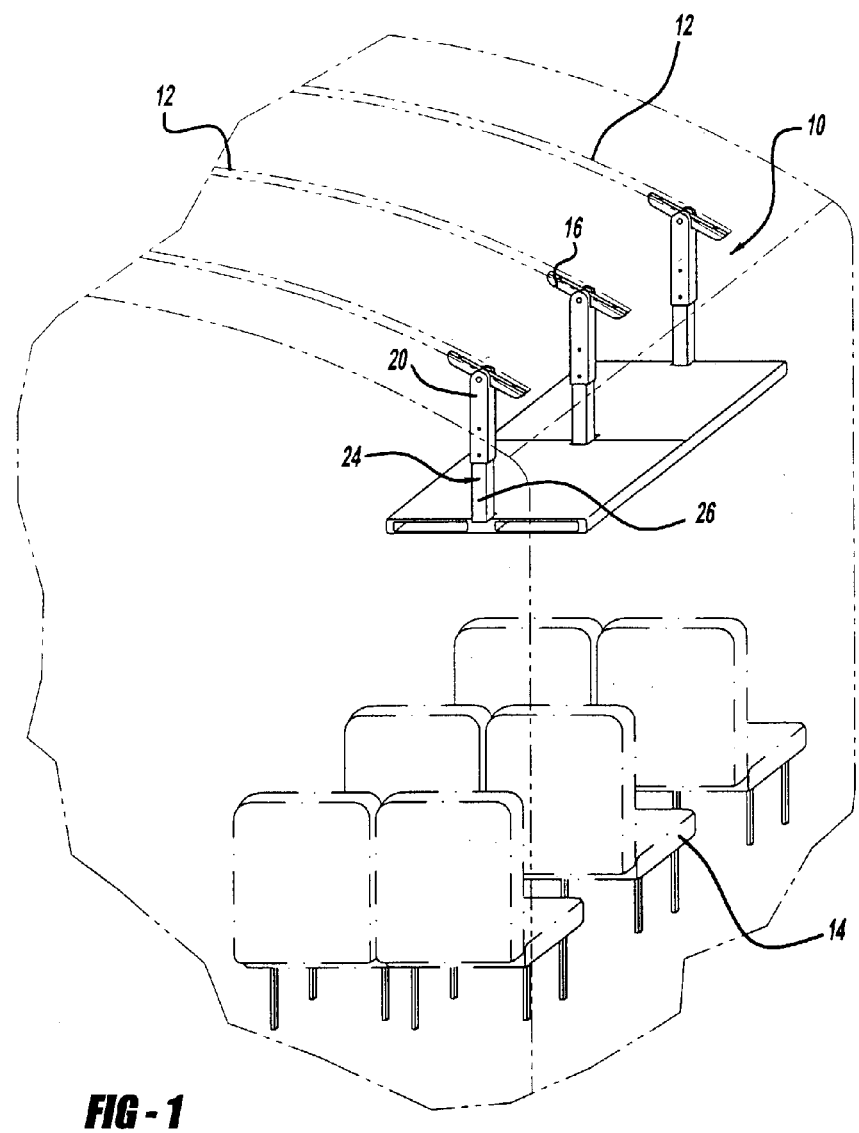
FIG. 1 is a perspective view, partially broken away of one embodiment of the present invention.

FIG. 1 shows a perspective view of one embodiment of the present invention attached in a public transit vehicle. A hanger bracket is generally shown at 10. The hanger bracket 10 is adapted to be connected with a suitable support structure in the public transit vehicle, such as, for example, roof bows 12. The roof bows 12 typically extend across the roof of the vehicle and provide a support structure for the roof, and side wall of the vehicle. In the preferred orientation, the hanger brackets 10 are positioned above a seating area 14 in the vehicle. The hanger brackets 10 are spaced from each other. The spacing varies from vehicle to vehicle and is typically in the range of about a meter. Any spacing of the hanger brackets 10 is within the scope of the present invention.

Figure 2:
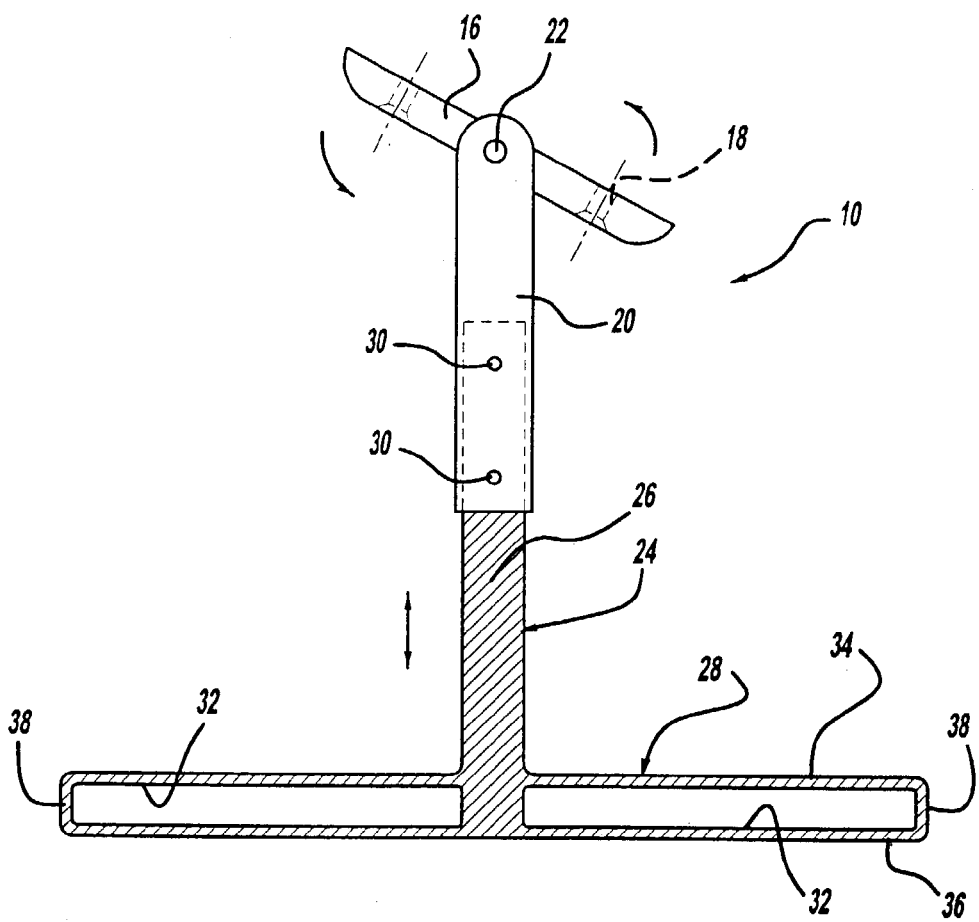
FIG. 2 is a side elevational view of one embodiment of the present invention.

FIG. 2 shows a plan view of a hanger bracket 10 according to one embodiment of the present invention. As shown, the hanger bracket 10 includes a mounting member 16. The mounting member 16 includes at least one opening 18 for receiving a fastener (not shown) to attach the hanger bracket 10 to the roof bows 12. The mounting member 16 is pivotally secured to a first hanger bracket member 20. The first hanger bracket member 20 is pivotally secured to the mounting member 16 by a suitable pivot pin 22. The pivot pin 22 can comprise any suitable structure, such as, for example, nuts and bolts, screw, rivet, or the like. It is preferred that the pivot pin 22 be capable of being tightened once the first hanger bracket member 20 is in the proper orientation with respect to the mounting member 16. This allows the first hanger bracket member 20 to be secured in position and further relative motion between the first hanger bracket member 20 and mounting member 16 is limited until such time it is desired to loosen the connection at the pivot pin 22 and allow for pivotal movement. Such an arrangement allows the mounting member 26 to be placed in the proper orientation with respect to the roof bows 12, and then the first hanger bracket member 20 can be properly aligned by pivoting around the pivot pin 22 and then secured in location relative to the mounting member 16.

A second hanger bracket member 24 is telescopically connected with the first hanger bracket member 20. The first hanger bracket member 20 and second hanger bracket member 24 telescope with respect to one another to allow for height adjustment of the second hanger bracket member 24 in the vehicle. The second hanger bracket 24 includes telescopic member 26 and a platform member 28. The platform member 28 preferably is integral with telescopic member 26 and extends transversely with respect thereto.

In the preferred embodiment, the platform member 28 has a relatively narrow width, the dimension into the plane of the paper is viewed in FIG. 2. Preferably the platform member 28 is only between one and five inches in width. It will be appreciated, however, that the platform member 28 may have any suitable width within the scope of the present invention. The platform members 28 are for receiving one or more platform extensions as will be described below. These platform extensions preferably comprise extruded panels that are supported on the platform member 28.

In the preferred arrangement, telescopic member 26 is received within the first hanger bracket member 20 for telescopic movement with respect thereto. The telescopic member 26 can be fixed with respect to the first hanger bracket member 20 by securing suitable fasteners 30 through the first hanger bracket member 20 and telescopic member 26. The fasteners 30 can comprise any suitable fastener, such as, for example, screws, nuts and bolts, pins, rivets, or the like. Further, telescopic member 26 may include a series of holes therethrough for allowing multiple adjustments between the first hanger bracket member 20 and the telescopic member 26. Alternatively, and as shown in FIG. 2, once the telescopic member 26 is positioned such that the platform member 28 is in the proper orientation with respect to the seating area 14, a hole, may be drilled through the telescopic member 26 and the first hanger bracket member 20 for receiving the fasteners 30 to secure the telescopic member 26 with the first hanger bracket member 20. Additionally, the first hanger bracket member 20 and telescopic member 26 may include horizontal ribs (not shown) that engage to help limit telescopic movement therebetween.

By utilizing an adjustable, and preferably telescopic, arrangement between the first hanger bracket member 20 and the telescopic member 26, a single hanger bracket 10 can be used in vehicles of different sizes. The vehicle size differential, and particularly the dimension between the roof and seating areas of the vehicles, can be compensated for by simply adjusting the telescopic member 26 to the desired orientation with respect to the first hinge bracket member 20.

In the preferred embodiment, the first hanger bracket member 20 preferably comprises square tubing. Further, the hanger bracket member 20 is preferably made of aluminum or steel. It will be appreciated, however, that any material may be used to make the first hanger bracket member 20 such as, for example, plastic, glass reinforced plastic, carbon reinforced plastic, or the like.

The second hanger bracket member 24 similarly may be comprised of aluminum or steel. It is preferred that the second hanger bracket member 24 be made as an aluminum die cast. Further, it is preferred that the telescopic member 26 also has a square profile for nesting arrangement within the first hanger bracket member 20. It will, again, however be appreciated that the second hanger bracket member 24 may comprise any material such as, for example, plastic, glass reinforced plastic, carbon reinforced plastic, or the like.

As further shown in FIG. 2, the platform member 28 may define openings 32. More specifically, the platform member 28 includes an upper platform member 34 and a lower platform member 36. End walls 38 extend between the upper platform member 34 and lower platform member 36. The openings 32 are defined between the upper platform member 34, lower platform member 36, and end walls 38. These openings 32 provide an open space for receiving wiring and for allowing air flow. Similarly, wires that need to be routed the entire length of the vehicle passenger compartment may be supported in the openings 32.

As shown in FIG. 2, the platform member 28 and openings 32 extend outwardly, in both directions from the second hanger bracket member 24. That is, the platform member 28 extends from the telescopic member 26 both toward the center, or aisle, of the vehicle and toward the side wall of the vehicle, which normally supports windows. Similarly, two separate openings 32 extend in the platform member 28, one toward the center of the vehicle and one toward the side wall. It will be appreciated that the platform member 28 may extend only in one direction from the telescopic member 26.

By utilizing a series of platform members 28 that support one or more platform extensions, as will be described in detail below, a platform can be provided in the vehicle at a desired-height with respect to the seating area 14. This platform can be used to support items, such as luggage. Further, the platform provides a system to accommodate other functions of the vehicle, such as, air ducting, lighting, window shading, and others.

Figure 3:
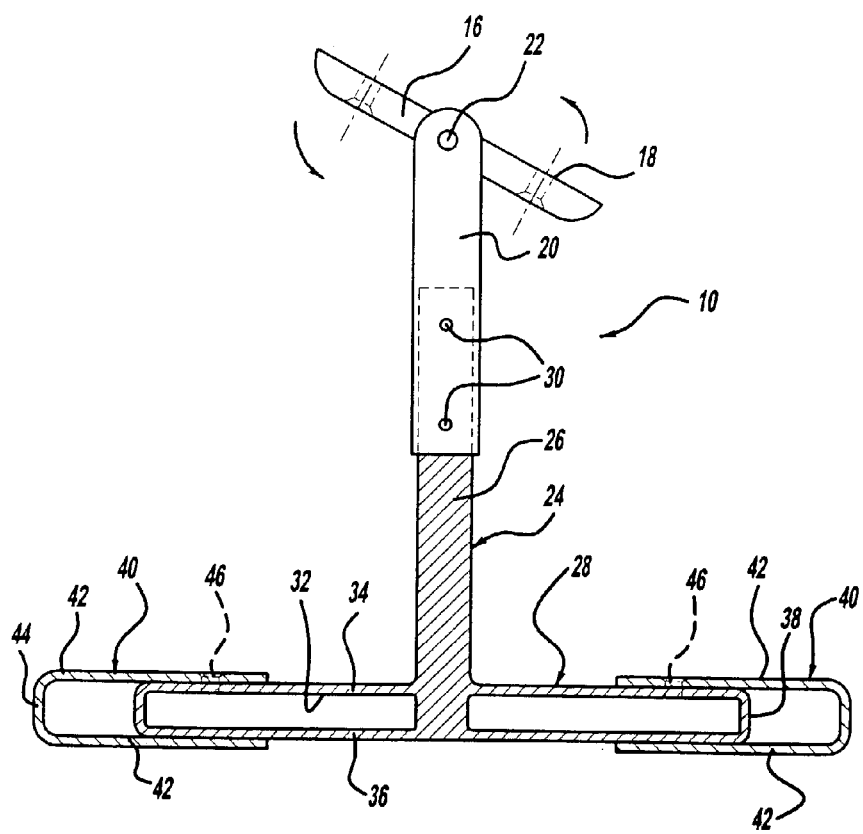
FIG. 3 is a side elevation view of an alternate embodiment of the present invention

FIG. 3 shows an alternate embodiment of the present invention. The alternate embodiment of FIG. 3 includes each of the elements of the embodiment shown in FIG. 2.

Platform extensions, generally indicated at 40, are telescopically disposed over the upper platform member 34 and lower platform member 36. The platform extensions 40 are preferably aluminum extrusions. These platform extensions 40 preferably run the entire desired length in the vehicle necessary to carry out the desired functions. Thus, one platform extension 40 will span more than one platform member 28. While one platform extension 40 is preferred on each of the aisle side and side wall side of the second hanger bracket member 24, it is to be understood that several such platform extensions 40 can be used in side-by-side relationship. Additionally, while aluminum is the preferred material, any other suitable material may be used. Some examples include, steel, plastic, glass reinforced plastic and carbon reinforced plastic.

The platform extensions 40 are generally U-shaped and have a pair of platform extension sections or arms 42 extending from an end wall 44. The arms 42 are telescopically disposed about the upper platform member 34 and lower platform member 36 and allow for telescopic movement in the direction of the arrow. This telescopic movement effectively allows the platform extensions 40 to be adjusted to any desired length left-to-right as viewed in FIG. 3. Once the desired position of the platform extensions 40 is achieved, by extending the platform extensions 40 to the proper orientation, the platform extensions 40 can be secured to the upper platform member 34 and lower platform member 36 by use of a plurality of fasteners 46. The fasteners 46 can comprise any suitable type fasteners, such as, for example, screws, nuts and bolts, pins, rivets, adhesives or the like. Additionally, if desired, the platform extensions 40 can be more permanently secured, such as by welding, brazing or the like.

As shown in FIG. 3, two platform extensions 40 are used. One platform extension is located on one side of the telescopic member 26 toward the center of the vehicle and one on the other side of the telescopic member toward the side wall of the vehicle. It will be appreciated that only one of the sides of the platform member 28 may include the platform extension 40 thereon.

By utilizing platform extension 40, a single second hanger bracket 24, having a common length of the platform member 28, can be used in vehicles of different sizes. The size differential can be compensated for by simply adjusting the extension 40 to the desired orientation with respect to the platform member 28.

Figure 4:
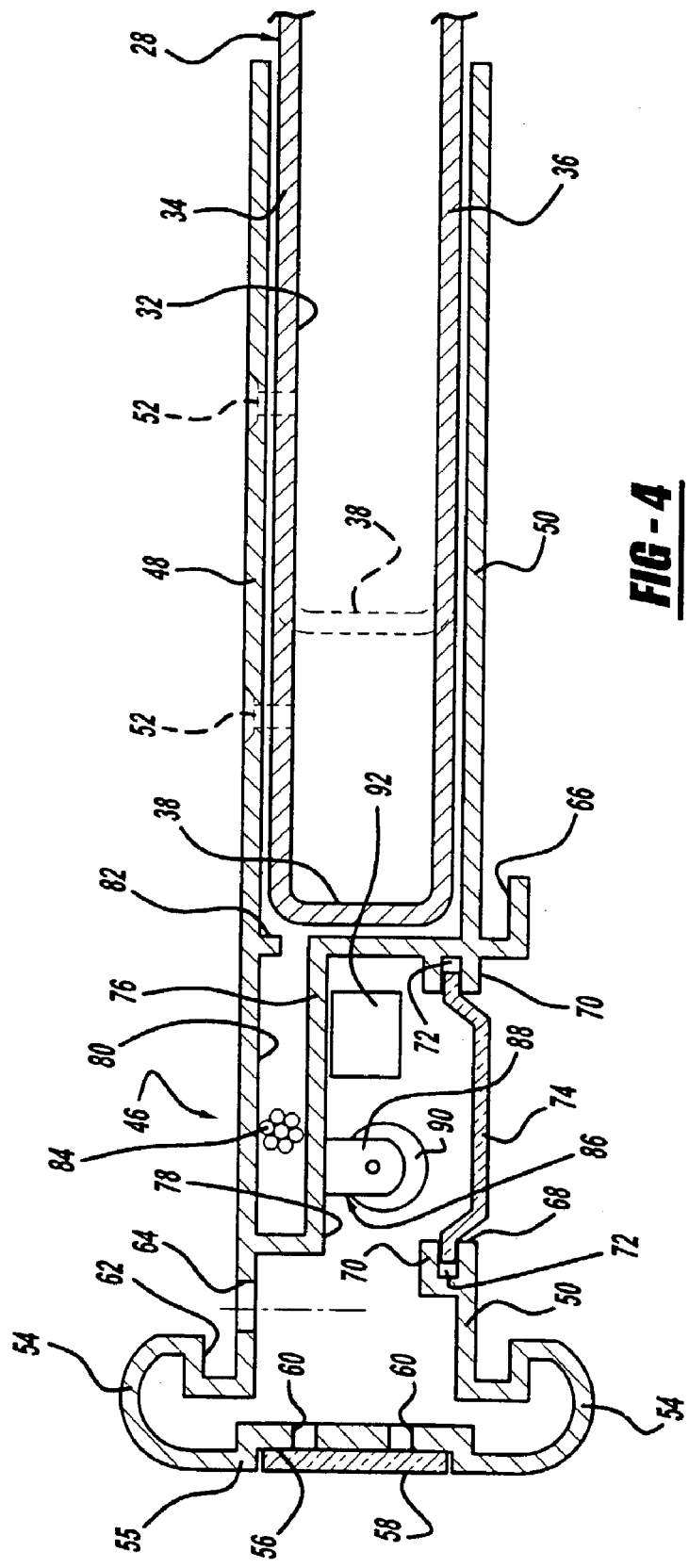
FIG. 4 is a cross-sectional view, broken away, of another embodiment of the present invention.

FIG. 4 is a cross sectional view of an alternate embodiment of the platform extensions. As shown in FIG. 4, an aisle platform extension is generally shown at 46. The aisle platform extension 46 is particularly useful on the portion of the platform member 28 that extends toward the center of the vehicle. The aisle platform extension 46 includes a first platform extension section 48 and a second platform extension section 50. As shown in FIG. 4, the first platform extension section 48 is adapted to be disposed over the upper platform member 34. The second platform extension section 50 is disposed about the lower platform member 36. The aisle platform extension 46 is movable with respect to the platform member 28. Preferably, the aisle platform extension 46 is telescopically disposed about the platform member 28. That is, the first platform extension section 48 and second platform extension section 50 can slide in telescopic fashion relative to the platform member 28.

FIG. 4 shows, in solid lines, one position of the aisle platform extension 46 relative to the platform member 28. FIG. 4 shows, in phantom, a second position of the platform member 28 relative to the aisle platform extension 46. Once the aisle platform extension 46 is positioned appropriately with respect to the platform member 28, the aisle platform extension 46 can be secured in position by the use of a suitable fastener 52. The fastener 52 can comprise any suitable fastener, such as, for example, a screw, nut and bolt, rivet, pin, adhesives, or the like. Additionally, if desired, the aisle platform extension 46 can be more permanently secured to the platform member 28 such as by welding or brazing. The fastener 52 is preferably connected between the first platform extension section 48 and upper platform member 34 to prevent relative movement between the platform extension section 46 and the platform member 28. It will be appreciated that the fastener 52 may be connected between the second platform extension section 50 and the lower platform member 36.

The aisle platform extension 46 further includes grab handles 54. As shown in FIG. 4, grab handles 54 are included on both the upper and lower portions of the aisle platform extension 46. That is, one of the grab handles 54 is toward the roof of the vehicle, while the other grab handle 54 is facing the seating area 14 of the vehicle. It will be appreciated that only one grab handle 54 may be included. An end wall 55 is also provided that defines grab handles 54. The end wall 55 may include a recessed area 56 for receiving a trim strip 58. The end wall 55 may also include one or more openings 60 therethrough for transmitting light through openings 60 through the trim strip 58 which will be described in further detail below.

A first groove 62 is defined between the first platform extension section 48 and grab handle 54. The first groove 62 is for receiving one end of a top deck panel 142, as will be described in further detail below. Further, the first platform extension section 48 may include a hole 64 therethrough for receiving a support post 158 for a luggage retainer as will be further described subsequently.

The second platform extension section 50 includes a second groove 66 for receiving a bottom deck panel 130, as will be described in further detail below. The second platform extension section 59 also includes an opening 68 therethrough. The opening 68 is to allow light to pass out of the aisle platform extension 46 into the interior space of the vehicle. The second platform extension 50 includes a pair of clips 70. The clips 70 comprise generally c-shaped structures defining openings 72 therein. The openings 72 are for receiving the edges of a lens 74. The lens 74 preferably comprises an extruded plastic lens that directs the light from interiorly of the aisle platform extension 46 to the interior compartment of the vehicle. It will be appreciated that the lens may comprise any suitable material.

The aisle platform extension 46 further preferably includes an interior wall 76 extending between the first platform extension section 48 and-second platform extension section 50. The interior wall 76 can take any suitable configuration. Alternatively, the interior wall 76 can be eliminated. As shown, interior wall 76 extends upwardly from the second platform extension section 50 then parallel to first platform extension section 48 for a distance, then upwardly to the first platform extension section. In this manner, a cavity 78 is defined between the interior wall 76 and the end wall 55 of the platform extension. Further, a raceway 80 is defined between the interior wall 76 and the first platform extension section 48. A suitable stop 82 may also be provided to limit telescopic movement of the aisle platform extension 46 with respect to the platform member 28.

The raceway 80 is suitable for receiving items such as wiring 84 that may be necessary to run the length of the vehicle. The wiring 84 may be used to provide electrical connection with light fixtures generally indicated at 86. The light fixtures 86 are preferably disposed in the cavity 78. More specifically, a light fixture hanger 88 is secured to the wall 76. A light tube 90 is connected to the hanger 88. Several light fixture hangers 88 and light tubes 90 are preferably secured the length of the aisle platform extension 46. Suitable electric elements, such as ballast 92, are also provided in the cavity 78. It will be appreciated that, while a fluorescent light tube 90 is shown, any suitable lighting arrangement can be used within the scope of the present invention. Further, in the event the interior wall 76 is eliminated, the light fixtures 86 may be connected directly to the first platform extension section 48 or the second platform extension section 50.

The light tube 90 is illuminated and light is directed out of the cavity 78 through the lens 74 into the interior of the vehicle. Additionally, light from the light tube 90 within the cavity 78 can be directed through the opening 60 to illuminate the trim strip 58. This is particularly useful if the trim strip 58 is translucent. The light passing through the opening 60 can illuminate the trim strip 58 which may contain information such as, for example, seat numbers, instructional materials, or advertising.

As shown in FIG. 4, the aisle platform extension 46 is placed in one orientation with respect to the platform member 28. In the orientation shown, light from the light tube 90 will pass downwardly through the lens 74 directly into the passenger seating area 14 of the vehicle. In certain instances, it may be desirable to have the light emanate through the lens 74 upwardly and reflect off an upper structure in the vehicle such as the roof structure of the vehicle or an advertising panel rather than being directed downwardly. This arrangement would, thus, provide indirect light to the seating area. In such a case, the aisle platform extension 46 can simply be placed in an upside-down orientation on the platform member 28. This upside-down orientation is shown, for example, in FIG. 10.

The aisle platform extension 46 preferably is extruded from aluminum. Such a system could be simply anodized or painted to provide an appropriate color for the aisle platform extension 46. It will be appreciated, however, that any suitable material can be used to form the platform extensions 46. Some such suitable materials include, steel, plastic, and glass or carbon reinforced plastic. In certain instances, it may be desirable to pultrude the aisle platform extension 46, especially if the aisle platform extension 46 is made from filled plastic materials. A single aisle platform extensions 46 preferably spans the entire desired length in the vehicle necessary to carry out the desired functions. Thus, one aisle platform extension 46 will span more than one platform member 28. While one aisle platform extension 46 is preferred on the aisle side of the second hanger bracket member 24, it is to be understood that several such aisle platform extensions 46 can be used in side-by-side relationship. Additionally, while aluminum is the preferred material, any other suitable material may be used. Some examples include, steel, plastic, glass reinforced plastic and carbon reinforced plastic.

FIG. 4 shows several features that can be incorporated in the aisle platform extension 46. It will be appreciated that any of the features can be used either alone or in any combination. By using such an aisle platform extension 46, the versatility of the aisle platform extension 46 is greatly increased.

Figure 5:
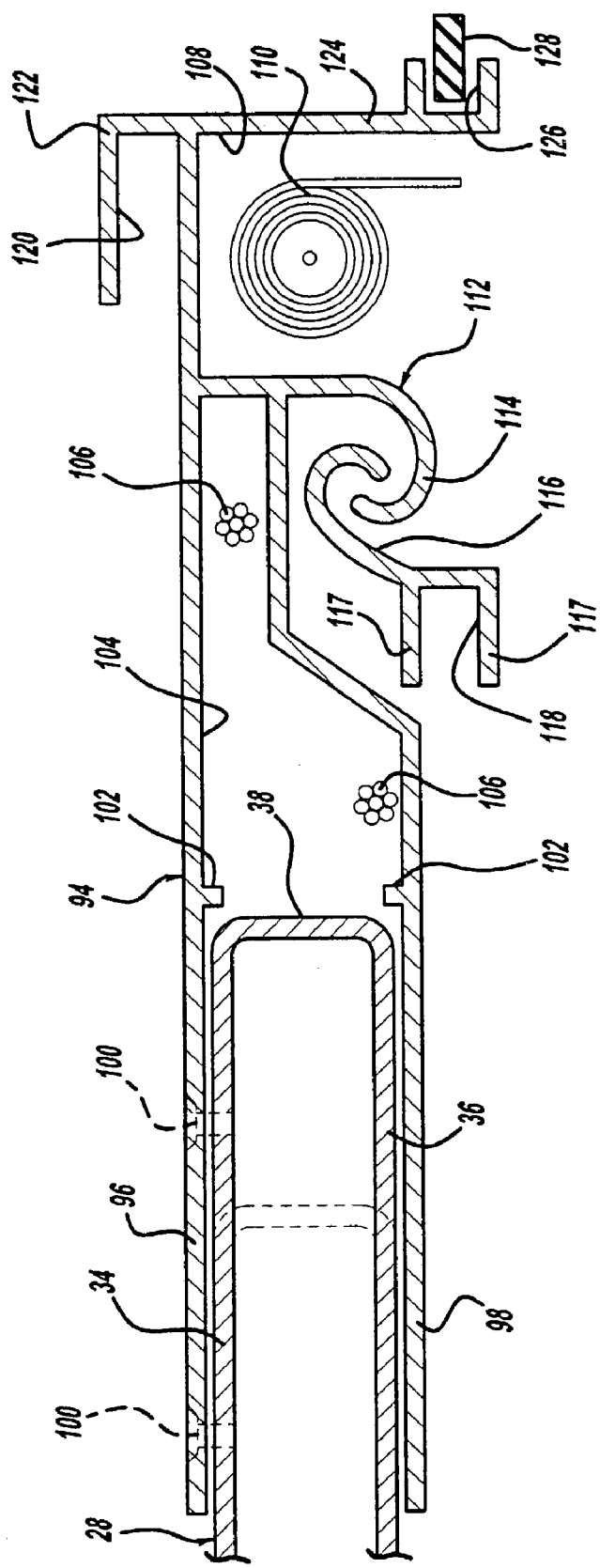
FIG. 5 is an alternate view, broken away, of another embodiment of the present invention.

FIG. 5 shows a window platform extension generally indicated at 94. The window platform extension 94 is movably disposed on the platform member 28. Preferably, the window platform extension 94 is telescopically disposed over the platform member 28. The window platform extension 94 is particularly adaptable to be used on the platform member 28 on the window side of the vehicle.

The window platform extension 94 includes a first platform extension section 96 and a second platform extension section 98. The first platform extension section 96 is for disposition adjacent the upper platform 34 of the platform member 28.

The second platform extension section 98 is for disposition adjacent the lower platform member 36 of platform member 28. The first platform extension section 96 and second platform extension section 98 can slide relative to the upper platform member 34 and lower platform member 36 allowing for telescopic movement of the window platform extension 94 with the platform member 28. When the window platform extension 94 is placed in the desired location, that is, telescoped to the desired location with respect to the platform member 28, a suitable fastener 100 can be used to secure the first platform extension section 96 with the upper platform member 34. Suitable fasteners 100 include screws, nuts and bolts, rivets, pins, adhesives, or the like. Additionally, if desired, the window platform extension 94 can be more permanently secured to the platform member 28 such as, by welding or brazing. Two positions of extension are shown in FIG. 5. One indicates the relative position of the platform member 28 in solid lines; the other shows the relative position of the platform member 28 in broken lines.

As shown in FIG. 5, each of the first platform extension section 96 and second platform extension section 98 includes a stop 102 thereon. The stop 102 limits telescopic movement of the window platform extension 94 with respect to the platform member 28. The first platform extension section 96 and second platform extension section 98 define a cavity 104 therebetween. The cavity 104 provides a raceway allowing passage of items throughout the length of the vehicle, such as, for example, wires 106.

The window platform extension 94 further defines a pocket 108 adjacent the outermost end of the window platform extension 94. This pocket 108 may be used to house a variety of items, such as, for example, a roller blind 110, which may be used to cover the exterior window of the vehicle. Similarly, other items may be housed in the pocket 108 such as, for example, additional lighting or the like. Alternatively, the pocket 108 can remain unused.

The window platform extension 94 further includes a hinge assembly, generally indicated at 112. The hinge assembly 112 includes a first hinge member 114 and a second hinge member 116. The first hinge member 114 comprises generally a J-shaped member that is for receiving a generally J-shaped second hinge member 116. The hinge members 114 and 116 cooperate to allow pivoting motion of the second hinge member 116 relative to the first hinge member 114. Limited fore and aft movement (toward and away from the side wall of the vehicle) is permitted between the first hinge member 114 and the second hinge member 116. The second hinge member 116 further includes a pair of opposing arms 117 defining a ledge or groove 118 therebetween. Pivoting movement of the second hinge member 116 causes a corresponding pivoting motion of the ledge or groove 118. This ledge 118 is for receiving one edge of a bottom deck panel 130, as will be further described below.

The window platform extension 94 further includes a first groove 120 extending upwardly from the first platform extension section 96. Specifically, an L-shaped arm 122 extends upwardly from the first platform extension section 96 to create the first groove 120 between the L-shaped arm 122 and the first platform extension section 96. The first groove 120 is for receiving one edge of a top deck panel 142 as will be described in further detail below.

Figure 10:
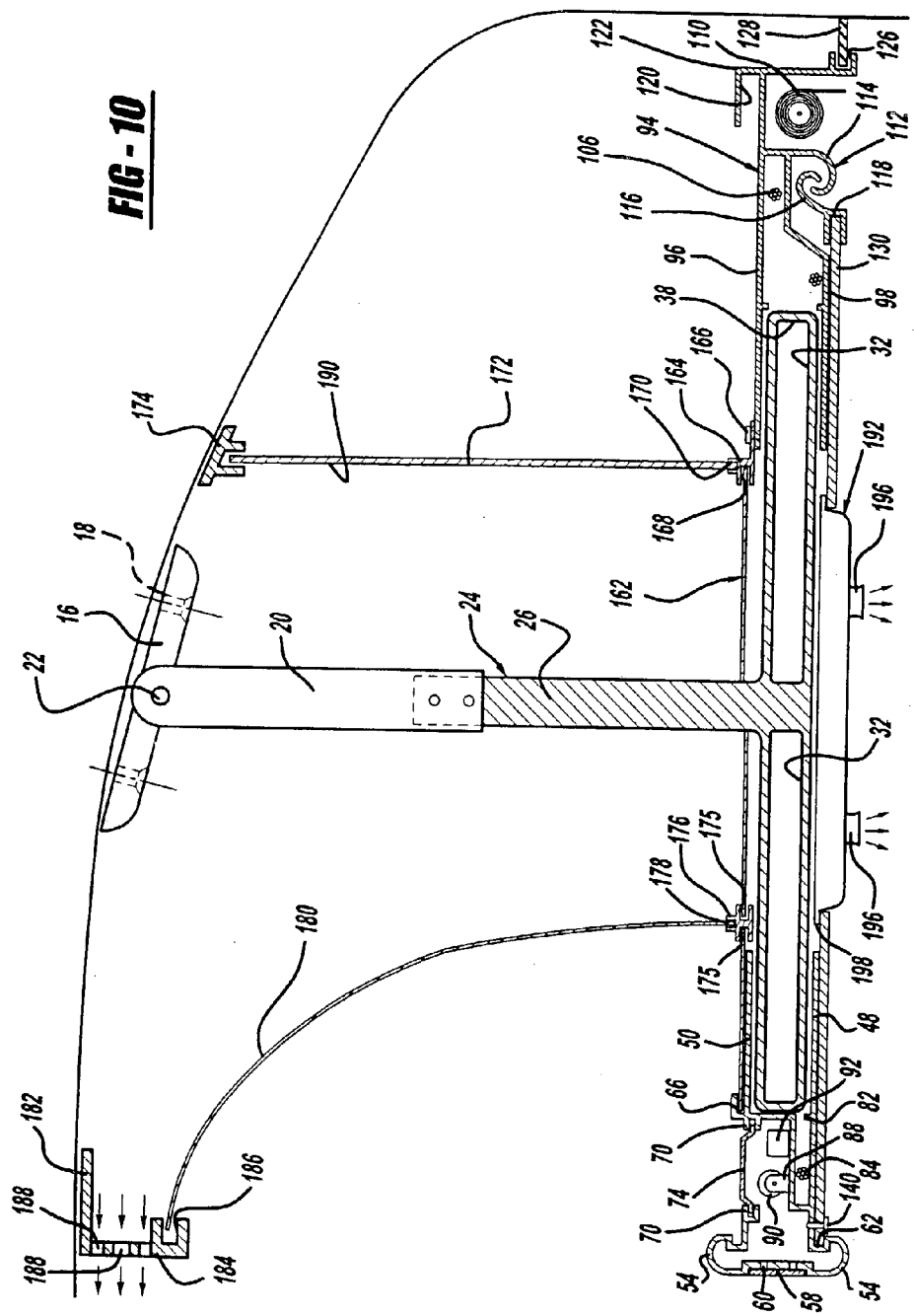
FIG. 10 is a plan view, partially in cross section, of an alternate embodiment of the present invention.

The window platform extension 94 further includes an end wall 124. The end wall helps define the pocket 108. More specifically, the pocket 108 is defined between the end wall 124, first platform extension section 96 and hinge assembly 112. Additionally, the end wall 124 includes a seat 126 at the lower end thereof for receiving a seal 128. In the preferred embodiment, a flexible vinyl seal 128 is provided and secured in the seat 126 in any suitable fashion. The seal 128 can be used to seal the window platform extension 94 with the vehicle interior, as best seen in FIG. 10.

The window platform extension 94 preferably is extruded from aluminum. Such a system could be simply anodized or painted to provide an appropriate color for the window platform extension 94. It will be appreciated, however, that any suitable material can be used to form the window platform extensions 94. Some such suitable materials include, steel, plastic, and glass or carbon reinforced plastic. In certain instances, it may be desirable to pultrude the window platform extension 94, especially if the window platform extension 94 is made from filled plastic materials. A single window platform extension 94 preferably spans the entire desired length in the vehicle necessary to carry out the desired functions. Thus, one window platform extension 94 will span more than one platform member 28. While one window platform extension 94 is preferred on the side wall side of the second hanger bracket member 24, it is to be understood that several such window platform extensions 94 can be used in side-by-side relationship. Additionally, while aluminum is the preferred material, any other suitable material may be used. Some examples include, steel, plastic, glass reinforced plastic and carbon reinforced plastic.

Figure 6:
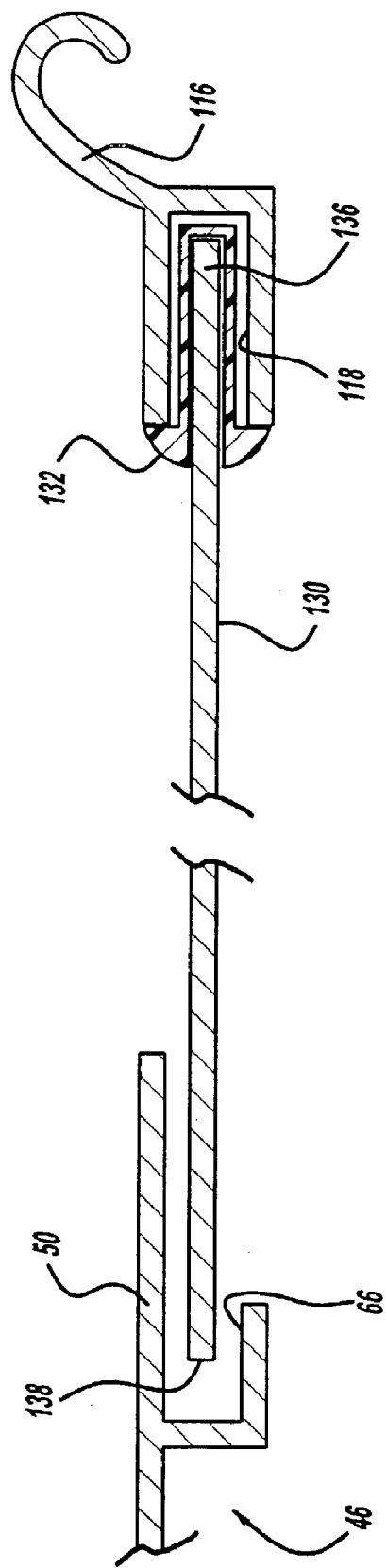
FIG. 6 is a cross sectional view, partially broken away, of an embodiment of the present invention.

FIG. 6 is a cross sectional view, partially broken away, showing a bottom deck panel 130 extending between the ledge 118 on the second hinge member 116 and the second groove 66 on the aisle platform extension 46. The bottom deck panel 130 is primarily used to trim or cover the bottom of the aisle platform extension 46, platform member 28 and window platform extension 94. Further, the bottom deck panel 130, when installed, completes the bottom portion of the ducting created by the assembly. As is shown in FIG. 6, an insert 132 is retained within ledge or groove 118. Preferably, the insert 132 is made of vinyl and aids in holding the bottom deck panel 130 in place. The insert 132 engages the bottom deck panel 130 to help retain it in the proper orientation. Preferably, bottom deck panel 130 is made of aluminum. The bottom deck panel 130 could be anodized or painted to provide an appropriate color for the bottom deck panel 130. It will, however, be appreciated that any material can be used to form the bottom deck panel 130. Such suitable materials include steel, plastic, glass reinforced plastic, carbon reinforced plastic, wood, laminates, Formica, other sheet material, or the like.

Also, ledge 118, on the second hinge member, may be longer in length than the second groove 66 on the aisle platform extension 46. In this manner, the bottom deck panel 130 can be inserted into the insert 132 in ledge 118 fully, the second hinge member 116 can then be pivoted about the first hinge member 114 and the bottom deck panel 130 can then be extended to engage the second groove 66. Preferably, there is a limited amount of movement between the first hinge member 114 and second hinge member 116 that allows the forward edge 138 of the bottom deck panel 130 to be placed in the second groove 66 on the aisle platform extension 46. More specifically, there is sufficient movement between the second hinge member 116 and first hinge member 114 so that once the bottom deck panel 130 is fully inserted into the insert 132, the bottom deck panel 130 can be pivoted such that the forward edge 138 clears the second groove 66 on the aisle platform extension 46. Once the bottom deck panel 130 is positioned adjacent the second platform extension section 50, the bottom deck panel 130 can be moved into the second groove 66, to the left as viewed in FIG. 6. This movement to the left, as viewed in FIG. 6, is limited by the engagement of the first 114 and second 116 hinge members. In this arrangement, the weight of the bottom deck panel 130 is fully supported by the ledges or grooves 66,118.

Figure 7:
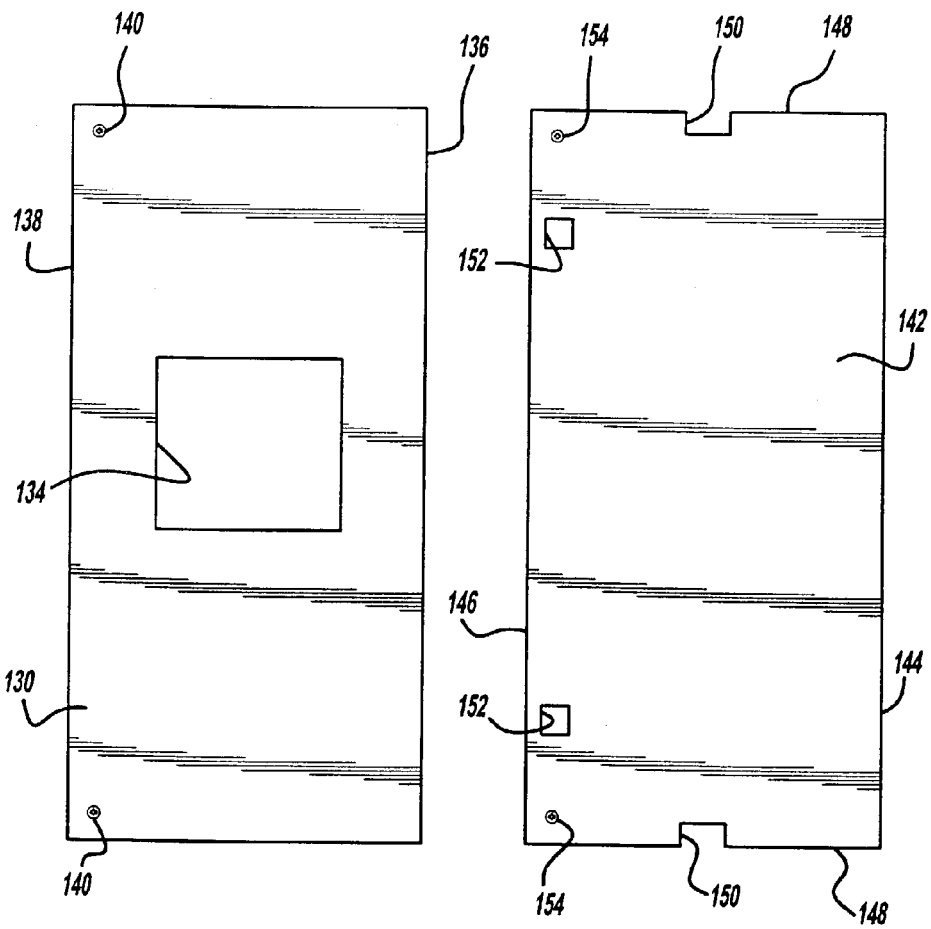
FIG. 7*a* is a plan view of a bottom deck member made in accordance with one embodiment of the present invention.
FIG. 7*b* is a plan view of a top deck member made in accordance with one embodiment of the present invention.

FIG. 7a shows a plan view of the bottom deck panel 130. As is shown, bottom deck panel 130 may include an opening 134. The opening 134 can be used to support of a service module, as will be described below. The bottom deck panel 130 includes a rear edge 136 and forward edge 138. The rear edge 136 is adapted for disposition in the ledge 118 of the second hinge member 116 and is secured therein by the insert 132. The forward edge 138 is adapted for disposition in the second groove 66 of the aisle platform extension 46.

In order to insert the bottom deck panel 130, the bottom deck panel 130 is inserted into the insert 132 and is inserted sufficiently so that, as the second hinge member 116 is pivoted upwardly, the forward edge 138 clears the second groove 66. When in position, the bottom deck panel 130 is pulled such that the forward edge 138 seats within the second groove 66 of the aisle platform extension 46.

The bottom deck panel 130 also includes a pair of fasteners 140. The fasteners 140 can be used to secure the bottom deck panel 130 with the aisle platform extension 46. It is noted that the fasteners 140 are used only to hold the bottom deck panel 130 in position. The fasteners 140 do not provide a weight bearing connection. Similarly, the fasteners 140 can be used to secure the bottom deck panel 130 to an adjacent bottom deck panel 130 in the event that the bottom deck panels are in an overlapping arrangement. While the fasteners 140 are shown adjacent the forward edge 138 of the bottom deck panel 130, it will be appreciated that the fasteners 140 could be located adjacent the rear edge 136. In this case, the fasteners may be secured to the window platform extension 94.

FIG. 7b is a plan view of a top deck panel 142. The top deck panel 142 is adapted to be used to trim the aisle platform extension 46, platform member 28, and window platform extension 94. Further, top deck panel 142, when installed, completes the top portion of the ducting created by the assembly. The top deck panel 142 includes a rear edge 144 and forward edge 146. Further, a pair of side edges 148 is included. The side edges 148 each preferably include a cutout 150. The cutout 150 is provided on the side edges 148 to allow the top deck panel 142 to fit around the telescopic member 26 of the hanger bracket 10. Alternatively, the cutouts 150 can be sized to fit around the first hanger bracket member 20. It will be appreciated that the cutout 150 may be a little larger than the telescopic member 26. This allows for the movement of the top deck panel 142 as described below.

As with the bottom deck panel 130, the top deck panel 142 is preferably made of aluminum. It will be appreciated, however, that any suitable material may be used for the top deck panel 142. Such suitable materials include, for example, steel, plastic, glass filled plastic, carbon filled plastic, wood, laminates, Formica, other sheet material, or the like.

In order to install the top deck panel 142, the rear edge 144 is slid into the first groove 120 of the window platform extension 94. The rear edge 144 is inserted sufficiently until the forward edge 146 can pass below the first groove 62 in the aisle platform extension 46. After the top deck panel 142 is adjacent the first platform extension section 48, the top deck panel 142 is moved forwardly (to the left as viewed in FIG. 9) until the forward edge 146 is positioned in the first groove 62 of the aisle platform extension 46. It is preferred that the depth of the first groove 120 on the window platform extension 94 is deeper than the depth of the first groove 62 on the aisle platform extension 46. This provides that when the forward edge 146 of the top deck panel 142 is moved forwardly into the first groove 62 on the aisle platform extension 46, the rear edge 144 remains in the first groove 120 on the window platform extension 94.

The top deck panel 142 also may include openings 152 for receiving support posts 158 of a luggage retainer, as will be described below. The top deck panel 142 also includes a plurality of fasteners 154. The fasteners 154 are used to secure the top deck panel 142 with the aisle platform extension 46. Alternatively, the fasteners 154 may be used to secure the top deck panel 142 with adjacent of the top deck panels 142.

While the fasteners 154 are shown adjacent the forward edge 146 of top deck panel 142, it will be appreciated that the fasteners 154 could be located adjacent the rear edge 144. In this case, the fasteners 154 may be secured to the window platform extension 94. The fasteners 154 do not support the weight of the top deck panel 142, but rather are used to hold them in place. The grooves 62 and 120 of respective platform extensions 46, 94 are used to bear the weight of the top deck panel 142.

Each of the widths from rear edge to forward edge of the top deck panel 142 and bottom deck panel 130 must be determined after the known length of extension of the platform extensions 46, 94. Once the total distance required is known, the width of the top deck panel 142 and bottom deck panel 130 can be determined and the panels can be cut to the appropriate width. It is also preferred that multiple top deck panels 142 be used in side-by-side arrangement and that multiple bottom deck panels 130 be used in side-by-side arrangement. It is noted that each of the top deck panel 142 and bottom deck panel 130 can be fabricated completed and then shipped to the vehicle manufacturer in a compact stack. This reduces the opportunity for damage and provides a freight expense benefit.

Figure 8:
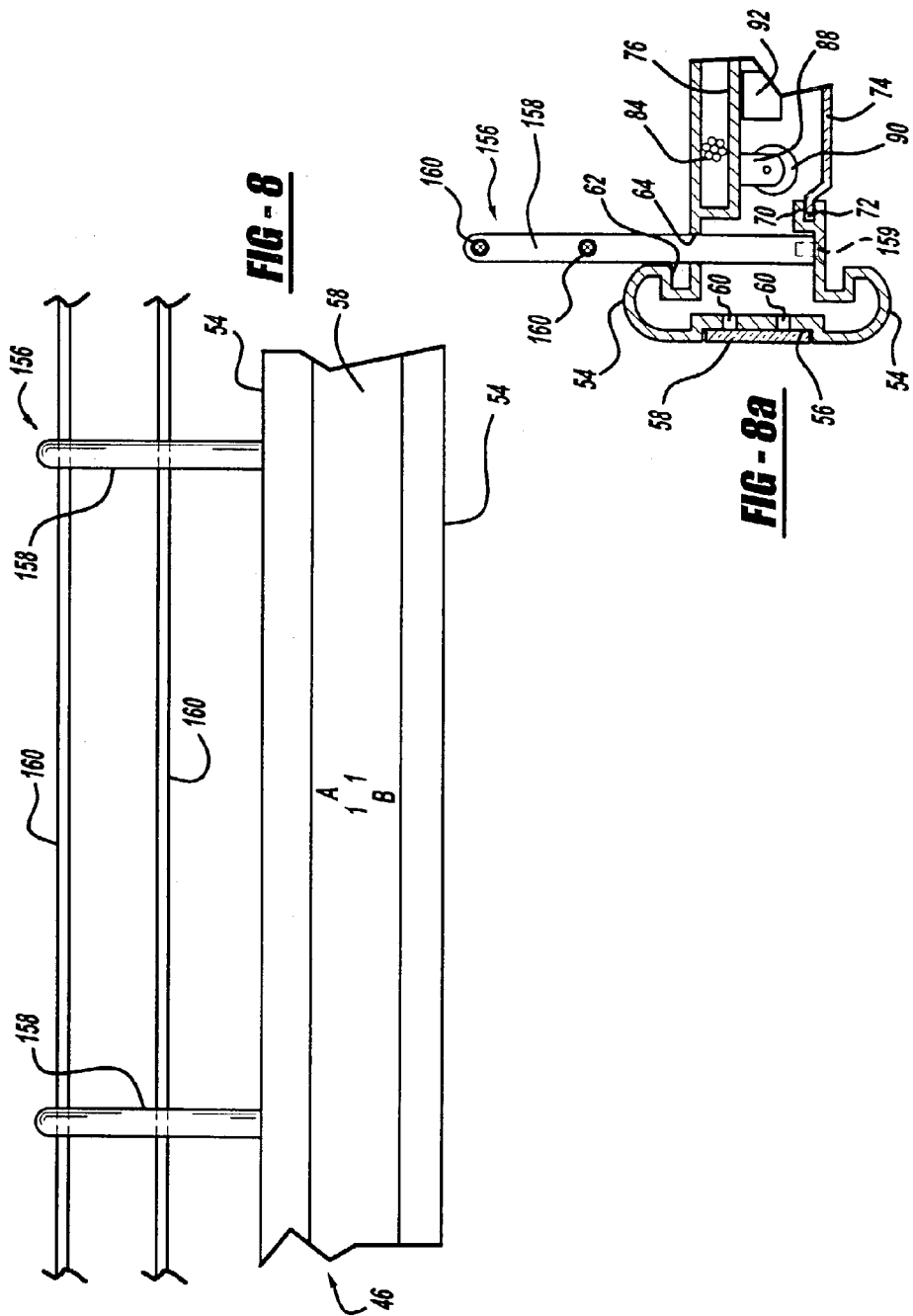
FIG. 8 is a plan view, broken away, of a luggage retainer in accordance with one embodiment of the present invention.

FIG. 8 is a plan view of a luggage retention assembly. A luggage retention assembly is generally shown at 156. The luggage retention assembly 156 is useable in certain embodiments of the present invention. It need not be included in every use. Further, FIG. 8 shows a trim strip 58 showing seat numbers.

FIG. 8a illustrates a side elevation view partially in cross section showing the support posts 158 and retention cables 160 disposed in the hole 64. The top deck panel 142 is not shown in FIG. 8a.

The luggage retention assembly 156 comprises a plurality of support posts 158. The support posts 158 are disposed in the holes 64 in the aisle platform extension 46. Additionally, the support posts 158 extend through the openings 152 in top deck panel 142. The support posts 158 preferably extend through the holes 64 and engage the second platform extension section 50. A fastener 159 may be used to secure the support post 158 to the second platform extension section 50. The support posts 158 may contact the rearward portion of the grab handle 54 to provide additional support for the support posts 158.

A plurality of retention cables 160 extend transversely through the support posts 158. The retention cables 160 provide retention for objects stowed by passengers on the top of the top deck panel 142, platform extensions 46, 94 and platform member 28. In this manner, the top deck panel 142, as well as platform extensions 46, 94 and platform member 28 serve to function as a luggage rack. The retention cables 160 can be any of a variety as are well known in the art.

Figure 9:
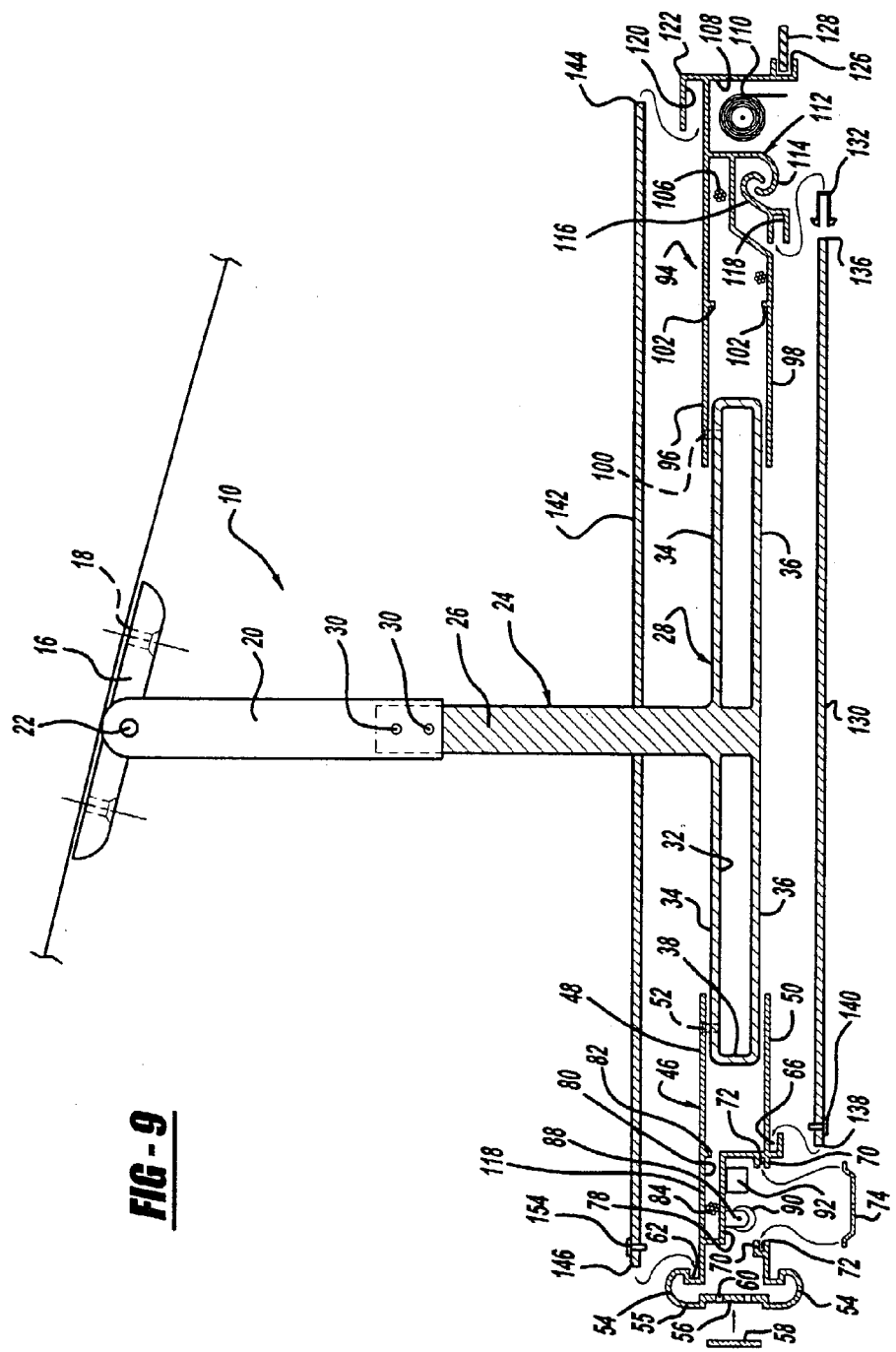
FIG. 9 is an exploded view of an embodiment of the present invention.

FIG. 9 is an exploded view of an assembly incorporating a hanger bracket 10 including a mounting member 16, first hanger bracket 20, second hanger bracket 24 including a platform member 28. Additionally, the assembly shown includes an aisle platform extension 46 and a window platform extension 94. The platform extensions 46, 94 are shown incorporating each of the features as set forth above. Top deck panel 142 and bottom deck panel 130 are also shown. The luggage retention assembly 156 is not shown.

It is preferred that each of the aisle platform extensions 46 and window platform extensions 94 comprise a single extrusion, respectively, that spans the desired length within the vehicle. Thus, each of the aisle platform extension 46 and window platform extensions span several platform members 28. It will be appreciated, however, that multiple aisle platform extrusions 46 may be used in side-by-side arrangement. Similarly, multiple window platform extensions 94 may be used in side-by-side arrangement.

In order to assemble the assembly shown in FIG. 9, the mounting member 16 is positioned at the appropriate location in the vehicle. The first hanger bracket member 20 is pivoted about the pivot pin 22 until it is in the desired orientation. The telescopic member 26 is adjusted relative to the first hanger bracket member 20 until it is in the proper orientation in the vehicle. When in the proper orientation, fasteners 30 are secured between the telescopic member 26 and first hanger bracket member 20. This procedure is repeated for each hanger bracket 10.

The aisle platform extension 46 is positioned over one end of each of the platform members 28. Specifically, the first platform extension section 48 and second platform extension section 50 are placed adjacent the upper platform members 34 and lower platform members 36 of the several platform members 28, respectively. This positioning can be accomplished either before or after the telescopic member 26 is mounted on the first hanger bracket member 20. The aisle platform extension 46 is telescoped over the platform member 28 until it is in the desired location. Once in the desired location, fastener 52 is used to secure the aisle platform extension 46 and prevent further relative movement between the aisle platform extension 46 and the platform member 28. It is preferred that only two fasteners 52 are used, one at frontmost edge of the aisle platform extension 46 connected to the frontmost platform member 28 in the vehicle, and one at the rearmost edge of the aisle platform extension 46 connected to the rearmost platform member 28 in the vehicle. However, any number of fasteners 52 may be used. A trim strip 58 may be placed in the recessed area 56 of end wall 55. Similarly, a light fixture hanger 88, light tube 90 and associated electric ballast 22 may be placed in cavity 78. Lens 74 may be placed in the opening 72 of clips 70 to direct light from the light tube 90 into the passenger compartment of the vehicle. Each of these items may also be placed in the aisle platform extension 46 prior to positioning it on the platform members 28.

Similarly, window platform extension 94 is disposed on one end of the platform member 28, preferably closest to the side wall of the vehicle. The window platform extension 94 is disposed such that the first platform extension section 96 and second platform extension section 98 are disposed adjacent the upper platform member 34 and lower platform members 36, of the several platforms 28, respectively. This positioning can be accomplished either before or after the telescopic member 26 is mounted on the first hanger bracket member 20. The window platform extension 94 is then extended to the desired location relative to the platform member 28. Once in the desired location, fastener 100 is used to secure the window platform extension 94 to the platform member 28. It is preferred that only two fasteners 100 are used, one at frontmost edge of the window platform extension 94 connected to the frontmost platform member 28 in the vehicle, and one at the rearmost edge of the window platform extension 94 connected to the rearmost platform member 28 in the vehicle. However, any number of fasteners 100 may be used.

The bottom deck panel 130 is then inserted into insert 132 that is retained in ledge 118. The rear edge 136 of the lower deck panel 130 is until it engages the back wall of the insert 32. The second hinge member 116 is then pivoted relative to the first hinge member 114 until the forward edge 138 of the lower deck panel member 130 passes the second groove 66. Once the lower deck panel 130 is adjacent the second platform extension section 50, the lower deck panel member 130 is moved to the left, as viewed in FIG. 9, until the forward edge 138 of the lower deck panel member 130 is retained by the second groove 66. Once the lower deck panel member 130 is in the proper orientation, a fastener 140 is provided to secure the lower deck panel member 130 in the proper orientation. While not shown in FIG. 9, a service module 192 of the type shown in FIG. 10 can also be used in this embodiment. Of course, a bottom panel 130 having a hole 134 could then be used.

The top deck panel 142 is installed by placing the rear edge 144 in the first groove 120 on the window platform extension 94. The top deck panel 142 is then slid to the right as shown in FIG. 9. The top deck panel 142 is then rotated downwardly until the forward edge 146 passes the first groove 62 on the aisle platform extension 46. Once the forward edge 146 of the top deck panel 142 is adjacent the first platform extension section 48, the top deck panel 142 is slid to the left as viewed in FIG. 9 until the forward edge 146 of the top deck panel 142 is inserted into the first groove 62 of the aisle platform extension 46. Once in the proper position, a fastener 154 is used to secure the top deck panel 142 in the proper orientation. Once assembled, a duct is formed between the top deck panel 142, window platform extension 94, bottom deck panel 130, and aisle platform extension 46. This duct can be used to pass heated or cooled air therethrough to deliver it in the vehicle. Additionally, any item that needs to span the length of the assembly, such as, for example, wiring, can be placed in the duct.

It will be appreciated that, while each of the aisle platform extension 46 and window platform extension 94 are shown in one orientation, that is, the aisle platform extension 46 toward the aisle and the window platform extension 94 toward the side wall of the vehicle typically having a window thereon, the platform extensions 46, 94 can be reversed. That is, the window platform extension 94 can be in the location where the aisle platform extension 46 is shown in FIG. 9 and vice versa. Similarly, one or each of the platform extensions 46, 94 can be placed in the same location, but with an upside-down orientation. For example, the aisle platform extension 46 can be rotated 180 degrees such that the light fixture 86 provides light through the lens 74 upwardly in the vehicle as opposed to direct lighting downwardly onto the vehicle passenger compartment 14. Such a reverse orientation is shown in FIG. 10. The ability to reverse the orientation of the extension member 46, 94 increases the versatility of the system.

FIG. 10 shows a side elevation view of another embodiment of the present invention. In the embodiment shown in FIG. 10, the aisle platform extension 46 is shown in an upside-down orientation such that the light fixture 86 provides light upwardly through lens 74 toward the roof of the vehicle. In this embodiment, an alternate top deck panel, generally indicated at 162, is used. The top deck panel 162 includes the cutouts (not shown) for placement around the telescopic member 26. A fastening clip 164 is secured by fastener 166 to the first platform extension section 96 of the window platform extension 94. The fastening clip 164 includes a first groove 168 and a transversely disposed second groove 170. The first groove 168 is for receiving the top deck panel 162. The second groove 170 is adapted to receive and retain a closure member 172. The closure member 172 extends from the fastening clip 164 to a second fastener 174 operatively associated with the roof of the vehicle.

A second fastening clip 176 is also included. The second fastening clip 176 is operatively associated with the top deck panel 162. The second fastening clip 176 includes a pair of oppositely disposed grooves 175 for receiving the top deck panel 162 as shown. The second fastening clip 176 further includes an upper groove 178 for receiving a panel 180. The panel 180 can comprise any type of panel, including an advertising panel. The lens 74 directs light upwardly and onto the panel 180. The panel 180 connects to an upper connector 182. The upper connector 182 preferably is operatively associated with the roof of the vehicle. The upper connector 182 includes a forward leg 184 and a groove 186. The groove 186 is for receiving the panel 180.

The forward leg 184 may include one or more openings 188 for allowing air flow therethrough in the direction of the arrows of FIG. 10. The closure member 172 may comprise an air duct panel. By utilizing closure member 172 and panel 180 extending between the top deck panel 162 and the roof of the vehicle, an air duct 190 can be formed therebetween. That is, the air duct 190 is formed between panel 172, top deck member 162, panel 180, forward leg 184 and the roof of the vehicle. Thus, heated or cooled air can be blown through the air duct 190.and into the passenger compartment of the vehicle through the openings 188. It will be appreciated that by using a seal 128 to provide a seal between the extension member 94 and the side of the vehicle, the panel 172 may, in certain applications, not be necessary. That is, because the edge air duct 190 will be formed by the seal 128 and the side of the vehicle.

An additional duct is formed between the top deck panel 162, window platform extension 94, bottom deck panel 130, and aisle platform extension 46. This duct can be used in the same manner as that set forth above, and, for example, to convey heated or cooled air.

The embodiment shown in FIG. 10 further includes a service module, generally indicated at 192. The service module 192 is for disposition in the opening 134 of bottom deck panel 130. The service module 192 includes a peripheral flange 198 for engaging the bottom deck panel 130. The service module 192 may be held in place using suitable fasteners or adhesives, not shown.

The service module includes ports 196 providing fluid communication between the duct and the passenger compartment of the vehicle. The ports 196 can be selectively controlled by the passenger of the vehicle to selectively allow air flow out of the duct through the ports 196. The air flow from the opening 32 through the ports 196 is generally shown by the arrows in FIG. 10. Additionally, the service module may include a light fixture so as to provide reading lights to the passengers of the vehicle. The service module may include other features, such as a service call button or speakers. Any desirable feature can be included in the service module.

In order to gain access to the area above the lower deck panel member 130 to service the assembly, the fastener 140 is removed. The lower deck panel member 130 is then pushed rearwardly toward the hinge members 114,116. Once the lower deck panel member 130 clears the first groove 62, the lower deck panel member 130 can be pivoted about the first hinge member 114 and lowered to provide access to the area above the lower deck panel member 130. It will be appreciated that, because the orientation of the aisle platform extension 46 is reversed, the lower deck panel member 130 will seat in the first groove 62, which now is on the bottom side of the assembly.

By using a system that incorporates telescopic hanger brackets 10, each having a transverse platform member 28, the basic system can be used in a wide variety of vehicles. The system allows the platform 28 to be selectively adjustable to any height within the vehicle. This reduces the need for custom fabricated parts to fit the system in a variety of vehicles. Similarly, by using extensions, such as platform extensions 40, aisle platform extensions 46 and a window platform extensions 94, the effective width of the platform, between the aisle and window, can be adjusted to fit a variety of vehicles. This too reduces the need for the custom fabrication of parts to fit a variety of vehicles. Thus, the system is adjustable in both the height and width directions to allow use in vehicles of varying sizes. The main pieces that will have to be customized for the vehicle are the bottom deck panel 130 and top deck panel 142. These components will need to be cut to the appropriate width and length.

In certain applications, the width of the vehicle may require a greater width than can be accomplished by extending the aisle platform extension 46 and the window platform extension 94 on the platform member 28. In this case, the platform extensions 40, as shown in FIG. 3, may be placed on one or both sides of the platform member 28. These platform extensions 40 can be extended, ie slid relative to the platform member 28. Then, the aisle platform extension 46 and window platform extension 94 can be telescopically disposed over the platform extensions 40. The aisle platform extension 46 and window platform extension 94 are then placed in the desired location within the vehicle. When the desired location is achieved, the platform extensions 40 can be fastened to the platform members 28 and each of the aisle platform extension 46 and window platform extension 94 can be secured to the respective platform extension 40.

The several components described above in various combinations provide a modular system that can provide many functions in the vehicle, luggage racks, HVAC ducting, wiring raceways, lighting, advertising panels, and window blinds, for example for use in any type of public transit vehicle. The system reduces the number of custom components required in prior systems.

The invention has been described in an illustrative manner and it is to be understood that the terminology used is intended to be in the nature of description rather than of limitation. Obviously, many modifications and variations are possible in light of the above teaching. Therefore, it is to be understood that within the scope of the appended claims, the invention may be practiced otherwise than specifically discussed.

What is claimed is:

1. A modular system for use in a vehicle comprising:
a hanger bracket comprising a mounting member adapted to be secured to the vehicle, a first hanger bracket member pivotally secured to said mounting member and a second hanger bracket member slidably connected with said first hanger bracket member, said second hanger bracket member comprising a telescopic member and a platform member extending transversely with respect to said telescopic member, said platform member having an upper surface and a lower surface; and
a platform extension slidably disposed about said upper surface and said lower surface of said platform member such that said platform extension is configured to receive said platform member therein,
wherein said platform extension is adapted to extend outwardly from said platform member.

2. A modular system as set forth in claim 1 wherein said platform extension comprises a first platform extension section adjacent said upper surface of said platform member a second platform extension section adjacent said lower surface of said platform member and an end wall interconnecting said first platform extension section and said second platform extension section.

3. A modular system for use in a vehicle comprising:
a hanger bracket comprising a mounting member adapted to be secured to the vehicle, a first hanger bracket member pivotally secured to said mounting member and a second hanger bracket member slidably connected with said first hanger bracket member, said second hanger bracket member comprising a telescopic member and a platform member extending transversely with respect to said telescopic member, said platform member having an upper surface and a lower surface; and
a platform extension slidably disposed about said upper surface and said lower surface of said platform member such that said platform extension is configured to receive said platform member therein,
wherein said platform extension is adapted to extend outwardly from said platform member,
wherein said platform extension comprises a first platform extension section adjacent said upper surface of said platform member a second platform extension section adjacent said lower surface of said platform member and an end wall interconnecting said first platform extension section and said second platform extension section, and
further comprising a top deck panel adjacent said first platform extension section.

4. A modular system as set forth in claim 3 further comprising a bottom deck panel adjacent said second platform extension section.

5. A modular system as set forth in claim 4 wherein said top deck panel, bottom deck panel and extension define a duct therebetween.

6. A modular system as set forth in claim 4 further comprising first and second extensions slidably disposed on said platform.

7. A modular system as set forth in claim 6 wherein said top deck and said bottom deck panels extend between said first and said second extensions and wherein said first and said second extensions, said top deck panel and said bottom deck panel define a duct therebetween.

8. A modular system as set forth in claim 2 wherein said extension defines a cavity therein.

9. A modular system for use in a vehicle comprising:
a hanger bracket comprising a mounting member adapted to be secured to the vehicle, a first hanger bracket member pivotally secured to said mounting member and a second hanger bracket member slidably connected with said first hanger bracket member, said second hanger bracket member comprising a telescopic member and a platform member extending transversely with respect to said telescopic member, said platform member having an upper surface and a lower surface; and
a platform extension slidably disposed about said upper surface and said lower surface of said platform member such that said platform extension is configured to receive said platform member therein,
wherein said platform extension is adapted to extend outwardly from said platform member,
wherein said platform extension comprises a first platform extension section adjacent said upper surface of said platform member a second platform extension section adjacent said lower surface of said platform member and an end wall interconnecting said first platform extension section and said second platform extension section,
wherein said extension defines a cavity therein, and wherein a light fixture is disposed in said cavity.

10. A modular system as set forth in claim 9 wherein said cavity includes an opening for allowing light to pass through said opening.

11. A modular system as set forth in claim 10 further comprising a lens covering said cavity for directing the light passing through said opening.

12. A modular system as set forth in claim 9 wherein said end wall includes a recess and a hole between said recess and said cavity for allowing light to pass from said cavity to said recess.

13. A modular system as set forth in claim 12 further comprising a trim strip for disposition in said recess.

14. A modular system as set forth in claim 2 wherein said end wall defines a grab handle.

15. A modular system as set forth in claim 4 further comprising a groove adjacent said first platform extension section, said top deck panel disposed in said groove.

16. A modular system as set forth in claim 4 further comprising a groove adjacent said second platform extension section, said bottom deck panel disposed in said groove.

17. A modular system for use in a vehicle comprising:
a hanger bracket comprising a mounting member adapted to be secured to the vehicle, a first hanger bracket member pivotally secured to said mounting member and a second hanger bracket member slidably connected with said first hanger bracket member, said second hanger bracket member comprising a telescopic member and a platform member extending transversely with respect to said telescopic member, said platform member having an upper surface and a lower surface; and
a platform extension slidably disposed about said upper surface and said lower surface of said platform member such that said platform extension is configured to receive said platform member therein,
wherein said platform extension is adapted to extend outwardly from said platform member, wherein said platform extension comprises a first platform extension section adjacent said upper surface of said platform member a second platform extension section adjacent said lower surface of said platform member and an end wall interconnecting said first platform extension section and said second platform extension section,
wherein said extension defines a cavity therein, and further comprising a roller blind in said cavity.

18. A modular system as set forth in claim 4 wherein said extension member further comprises a hinge.

19. A modular system as set forth in claim 18 wherein said hinge defines a groove for receiving said bottom deck panel.

20. A modular system for use in a vehicle comprising:
a hanger bracket comprising a mounting member adapted to be secured to the vehicle, a first hanger bracket member pivotally secured to said mounting member and a second hanger bracket member slidably connected with said first hanger bracket member, said second hanger bracket member comprising a telescopic member and a platform member extending transversely with respect to said telescopic member, said platform member having an upper surface and a lower surface; and
a platform extension slidably disposed about said upper surface and said lower surface of said platform member such that said platform extension is configured to receive said platform member therein,
wherein said platform extension is adapted to extend outwardly from said platform member,
wherein said platform extension comprises a first platform extension section adjacent said upper surface of said platform member a second platform extension section adjacent said lower surface of said platform member and an end wall interconnecting said first platform extension section and said second platform extension section, and
further comprising a luggage retainer connected to said extension.

21. A modular system as set forth in claim 20 wherein said luggage retainer comprises at least one support post disposed on said extension and at least one retainer cable supported by said support post.

22. A modular system as set forth in claim 21 wherein first platform extension section includes a hole for receiving said support post.

23. A modular system for use in a vehicle comprising:
a hanger bracket comprising a mounting member adapted to be secured to the vehicle, a first hanger bracket member pivotally secured to said mounting member and a second hanger bracket member slidably connected with said first hanger bracket member, said second hanger bracket member comprising a telescopic member and a platform member extending transversely with respect to said telescopic member, said platform member having an upper surface and a lower surface; and
a platform extension slidably disposed about said upper surface and said lower surface of said platform member such that said platform extension is configured to receive said platform member therein,
wherein said platform extension is adapted to extend outwardly from said platform member,
wherein said platform extension comprises a first platform extension section adjacent said upper surface of said platform member a second platform extension section adjacent said lower surface of said platform member and an end wall interconnecting said first platform extension section and said second platform extension section, and
further comprising an end wall including a seat thereon, and a seal disposed in said seat.

24. A modular system as set forth in claim 4 further comprising a connector operatively associated with the vehicle and a panel extending between said top deck panel and said connector.

25. A modular system as set forth in claim 24 wherein said top deck panel, said panel extending between said top deck panel and said connector, and said connector define a duct.

26. A modular system as set forth in claim 4 further comprising a service module disposed in said bottom deck panel.

27. A modular system for use in a vehicle comprising;
a hanger bracket comprising a mounting member adapted to be secured to the vehicle a first hanger bracket member pivotally secured to said mounting member and a second hanger bracket member connected with said first hanger bracket member, said second hanger bracket member comprising a telescopic member and a platform member extending transversely to and in two directions from said telescopic member; and
a pair of platform extensions slidably disposed about said platform member, such that said pair of platform extensions are configured to receive said platform member therein wherein said platform extensions are adapted to extend outwardly from said platform member in opposite directions.

28. A modular system as set forth in claim 27 wherein said platform member includes an upper surface and a lower surface.

29. A modular system as set forth in claim 28 wherein each of said platform extensions comprises a first platform extension section adjacent said upper surface of said platform member a second platform extension section adjacent said lower surface of said platform member and an end wall interconnecting said first platform extension section and said second platform extension section.

30. A modular system a s set forth in claim 29 further comprising a top deck panel adjacent said first platform extension section.

31. A modular system as set forth in claim 30 further comprising a bottom deck panel adjacent said second platform extension section.

32. A modular system as set forth in claim 31 wherein said top deck panel, bottom deck panel and extension define a duct therebetween.

33. A modular system as set forth in claim 31 further comprising first and second extensions slidably disposed on said platform.

34. A modular system as set forth in claim 33 wherein said top deck and said bottom deck panels extend between said first and said second extensions and wherein said first and said second extensions, said top deck panel and said bottom deck panel define a duct therebetween.

35. A modular system as set forth in claim 29 wherein said extension defines a cavity therein.

36. A modular system as set forth in claim 35 wherein a light fixture is disposed in said cavity.

37. A modular system as set forth in claim 36 wherein said cavity includes an opening for allowing light to pass through said opening.

38. A modular system as set forth in claim 37 further comprising a lens covering said cavity for directing the light passing through said opening.

39. A modular system as set forth in claim 36 where in said end wall includes a recess and a hole between said recess and said cavity for allowing light to pass from said cavity to said recess.

40. A modular system as set forth in claim 29 wherein said end wall defines a grab handle.

41. A modular system as set forth in claim 31 further comprising a groove adjacent said first platform extension section, said top deck panel disposed in said groove.

42. A modular system as set forth in claim 31 further comprising a groove adjacent said second platform extension section, said bottom deck panel disposed in said groove.

43. A modular system as set forth in claim 35 further comprising a roller blind in said cavity.

44. A modular system as set forth in claim 31 wherein said extension member further comprises a hinge.

45. A modular system as set forth in claim 44 wherein said hinge defines a groove for receiving said bottom deck panel.

46. A modular system as set forth in claim 29 further comprising a luggage retainer connected to said extension.

47. A modular system as set forth in claim 46 wherein said luggage retainer comprises at least one support post disposed on said extension and at least one retainer cable supported by said support post.

48. A modular system as set forth in claim 29 further comprising an end wall including a seat thereon, and a seal disposed in said seat.

49. A modular system as set forth in claim 31 further comprising a connector operatively associated with the vehicle and a panel extending between said top deck panel and said connector.

50. A modular system as set forth in claim 49 wherein said top deck panel, said panel extending between said top deck panel and said connector, and said connector define a duct.

51. A modular system as set forth in claim 31 further comprising a service module disposed in said bottom deck panel.

* * * * *